US012809729B2

(12) United States Patent
Smith et al.

(10) Patent No.: US 12,809,729 B2

(45) Date of Patent: Nov. 24, 2026

(54) SYSTEMS AND METHODS FOR GENERATING CONVERSION MEASUREMENT DIAGNOSTICS

(71) Applicant: Google LLC, Mountain View, CA (US)

(72) Inventors: Claire Victoria Smith, San Rafael, CA (US); Pinji Zhao, Los Altos, CA (US); Hao Chen, Sunnyvale, CA (US); Dian Lin, Jersey City, NJ (US); Zhenzhen Xue, Sunnyvale, CA (US); Rachel Omega Dale, Brooklyn, NY (US); Aida Abdikulova, Brooklyn, NY (US); Yue Liang, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 15 days.

(21) Appl. No.: 18/957,278

(22) Filed: Nov. 22, 2024

(65) Prior Publication Data

US 2025/0355775 A1 Nov. 20, 2025

Related U.S. Application Data

(60) Provisional application No. 63/649,685, filed on May 20, 2024.

(51) Int. Cl.
*G06F 11/1479* (2026.01)
*G06F 11/07* (2006.01)
*G06F 11/34* (2006.01)

(52) U.S. Cl.
CPC ...... *G06F 11/1479* (2013.01); *G06F 11/0793* (2013.01); *G06F 11/3495* (2013.01)

(58) Field of Classification Search
CPC ............ G06F 11/1479; G06F 11/0793; G06F 11/3495; G06F 11/3438; G06F 11/3476
USPC ........................................... 705/14.45, 14.69
See application file for complete search history.

(56) References Cited

U.S. PATENT DOCUMENTS

2010/0114714 A1* 5/2010 Vitek .................... G06Q 30/00 705/14.69
2018/0137252 A1* 5/2018 Mairs .................... G16H 40/63
2024/0357017 A1* 10/2024 Bhat .................... H04L 67/535

OTHER PUBLICATIONS

Jonas Kurzweg, Mobile app conversion rate: benchmarks & best practices 2024, 2024 (Year: 2024).*

* cited by examiner

*Primary Examiner* — Tarek Elchanti
(74) *Attorney, Agent, or Firm* — DORITY & MANNING, P.A.

(57) ABSTRACT

A method for generating conversion measurement diagnostics for different content applications based on feature data from multiple features includes requesting the feature data associated with a particular account at a configured interval, processing the received feature data to generate diagnostic signals according to predetermined logic for each of a plurality of available diagnostics for a plurality of applications, then storing the diagnostic signals with timestamps within a common data layer. When a diagnostic status request associated with the particular account is received via a first application, first diagnostic signals are retrieved from the common data layer, where each of the first diagnostic signals is associated with first diagnostics enabled for the first application. Then, a user interface for the first application is provided to display a separate interface element for each of the first diagnostics, each interface element indicating corresponding ones of the first diagnostic signals.

19 Claims, 5 Drawing Sheets

112
| | EMBEDDABLE DIAGNOSTICS UI DIAGNOSTIC CONFIGURATION | | | |
|---|---|---|---|---|
| DIAGNOSTIC | APP 1 | APP 2 | APP 3 | APP N |
| 1 | ENABLED | ENABLED | ENABLED | ENABLED |
| 2 | ENABLED | ENABLED | ENABLED | ENABLED |
| 3 | NOT ENABLED | DO NOT ENABLE | DO NOT ENABLE | DO NOT ENABLE |
| 4 | ENABLED | NOT ENABLED | DO NOT ENABLE | ENABLED |
| 5 | DO NOT ENABLE | DO NOT ENABLE | ENABLED | ENABLED |
| 6 | DO NOT ENABLE | ENABLED | DO NOT ENABLE | DO NOT ENABLE |
FIG. 2
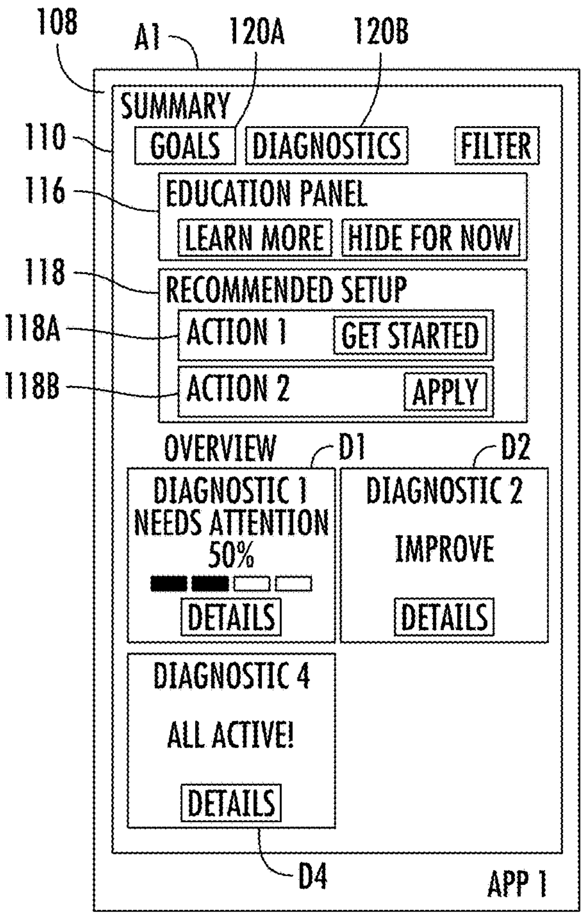
FIG. 3A
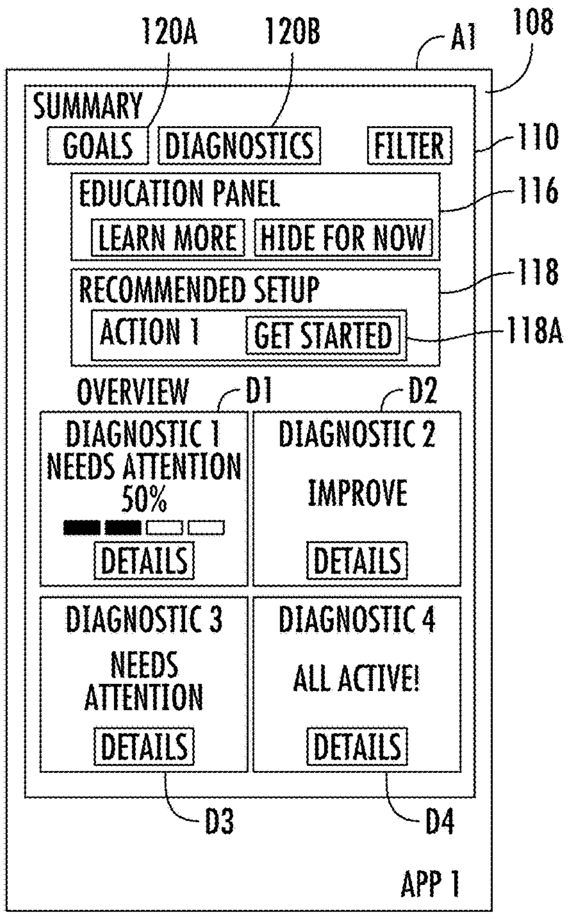
FIG. 3B

SYSTEMS AND METHODS FOR GENERATING CONVERSION MEASUREMENT DIAGNOSTICS

CROSS-REFERENCE TO RELATED APPLICATION

The present application is based on, and claims benefit of priority to, U.S. Provisional Application 63/649,685 having a filing date of May 20, 2024, which is incorporated by reference herein in its entirety.

FIELD

The present disclosure relates generally to systems and methods for generating conversion measurement diagnostics for different content applications based on feature data from multiple features, without having to separately process the feature data using different pipelines for each application.

BACKGROUND

As privacy changes are implemented, like third party cookie deprecation, it is becoming more complex to measure conversions between online content delivery and interactions resulting from such delivered content. New measurement features that leverage other data (e.g., first-party data), such as offline conversion data, tag-based conversion data, consent choice data, or the like, are becoming more important for generating diagnostic signals for evaluating the success of conversions for multiple applications of online content serving. However, the data from each feature is typically separately processed by separate pipelines to create diagnostic signals for each application, even when multiple applications use the data to create similar signals. As such, diagnostic signals are redundantly computed, and often in different data formats, and thus, not easily shareable between applications. Further, updates to how diagnostic signals are generated from the feature data must be separately implemented in each separate pipeline. Moreover, the feature data may be pushed from the features ad hoc, and it is difficult to track the age of the data. Thus, the reliability of the diagnostic signals is questionable. From an end-user's perspective, it is difficult to tell when a feature is in use for a particular application, what features should be implemented for a particular application, if a feature is having issues, how to fix issues when they occur, if the issues are resolved, if the diagnostic measurements are up-to-date, and how changes impact the overall diagnostic measurements.

As such, systems and methods for providing reliable, standardized diagnostic signals across different applications based on data from different features would be helpful in the art.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for generating conversion measurement diagnostics for different content applications based on feature data from multiple features. For instance, the method may include requesting feature data associated with a particular account at a configured interval from a plurality of features, the feature data being indicative of interactions associated with content items. The method may further include receiving the feature data at the configured interval. Thereafter, the method may include processing the feature data received to generate diagnostic signals according to predetermined logic for each of a plurality of available diagnostics for a plurality of applications, then storing the diagnostic signals with corresponding timestamps within a common data layer. The method may further include receiving a diagnostic status request associated with the particular account from a user via a first application of the plurality of applications. Moreover, the method may include retrieving first diagnostic signals from the diagnostic signals stored within the common data layer in response to receiving the diagnostic status request, where each of the first diagnostic signals may be associated with one or more first diagnostics of the plurality of available diagnostics, and where the one or more first diagnostics may be enabled for the first application. Additionally, the method may include providing a user interface for the first application to display a diagnostic status interface, where the diagnostic status interface may include a separate interface element for each of the one or more first diagnostics, and where each interface element may indicate corresponding ones of the first diagnostic signals.

In some instances, the method may further include generating a recommendation for changing a setting associated with the first application based at least in part on the first diagnostic signals via one or more intelligence engines. In such instances, the diagnostic status interface may further include the recommendation.

In some instances, the diagnostic status interface further includes a link to an interface for changing the setting.

In some instances, the method may further include generating a historical trend for one or more of the first diagnostic signals based at least in part on the first diagnostic signals and the corresponding timestamps via one or more intelligence engines. In such instances, the diagnostic status interface may further include the historical trend.

In some instances, the method may further include determining an impact score for each of the first diagnostic signals, where each impact score may indicate an effect that the respective first diagnostic signal has on the one or more first diagnostics.

In some instances, retrieving the first diagnostic signals may include referencing client configuration settings to determine the first diagnostics enabled for the first application.

In some instances, the feature data may include at least one of offline conversion data, consent data, or tag data.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 2 depicts an example conversion diagnostic configuration chart managed by the example conversion measurement diagnostics generation system of FIG. 1 according to example embodiments of the present disclosure.

FIGS. 3A and 3B depict example user interfaces with summaries of conversion diagnostics generated by the example measurement diagnostics generation system of FIG. 1 for an example application according to example embodiments of the present disclosure.

Figure 1:
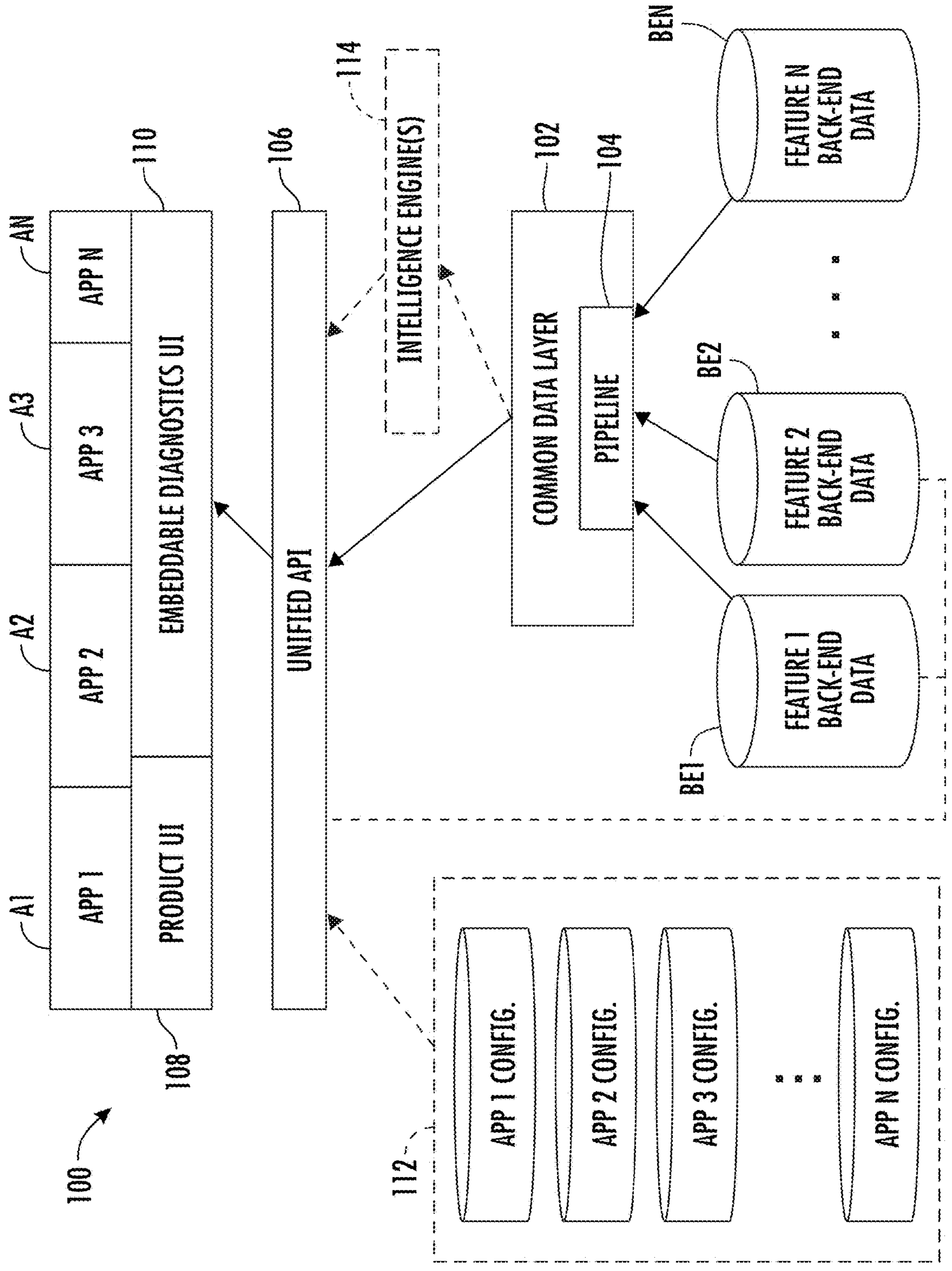
FIG. 1 depicts a block diagram of an example conversion measurement diagnostics generation system according to example embodiments of the present disclosure.

Reference numerals that are repeated across plural figures are intended to identify the same features in various implementations.

DETAILED DESCRIPTION

Generally, the present disclosure is directed to systems and methods for generating reliable, standardized conversion measurement diagnostics (e.g., regarding tag coverage, offline conversion data setup, online conversion setup, conversion value setup, consent management status, offline data importing status, or the like) across multiple applications related to or for content providing (e.g., search-based content providing applications, site-based content providing applications, content analytics applications, or the like).

As discussed above, new measurement features that leverage first-party data, such as offline conversion data, tag-based conversion data, consent choice data, or the like, are becoming important for generating diagnostic signals for evaluating the success of conversions for multiple applications of online content serving. However, the data from each measurement feature is typically separately processed by separate pipelines to create diagnostic signals for each application, even when multiple applications use the data to create similar signals. Further, updates to how diagnostic signals are generated from the feature data must be separately implemented in each separate pipeline. Moreover, the feature data is pushed from the features ad hoc, and it is difficult to track the age of the data. Additionally, from an end-user's perspective, it is difficult to tell when a feature is in use for a particular application, what features should be implemented for a particular application, if a feature is having issues, how to fix issues when they occur, if the issues are resolved, if the diagnostic measurements are up-to-date, and how changes impact the overall diagnostic measurements.

The disclosed systems and methods generate the conversion measurement diagnostics based on data (e.g., tag data, online conversion data, offline conversion data, consent data, or the like) from different features that are relevant to the different applications related to or for content providing without requiring separate processing of the data from the different features by each application. For example, the system can pull raw, back-end feature data associated with a client account from the measurement features at configured intervals. The feature data can be indicative of interactions associated with content items for the client account. For instance, the feature data can record clicks on content items, whether consent for sharing information associated with the interaction is allowed, whether an offline interaction corresponds to the content item, or the like. Each available diagnostic can generally have a plurality of signal statuses (e.g., excellent, good, needs attention, no recent data) which are determined by specific criteria (predetermined logic) being met by the feature data. The meaning of the statuses can vary across applications. As such, the feature data can be processed according to established or predetermined logic for each available diagnostic for the multiple applications to generate diagnostic signals (e.g., alerts or signal status). The diagnostic signals can then be stored with timestamps in a centralized data store of a central data layer, and in a common data format.

An embeddable user interface can be used across multiple applications, where the framework for the embeddable user interface can be easily adjustable to suit different configurations of diagnostics for different applications. The computing system can provide an interactive interface for a particular application, such that when a user accesses the user interface from a particular application, the computing system receives an input indicative of the user interaction or selection of an element of the interactive interface, automatically pulls relevant diagnostic signals corresponding to the configuration of diagnostics for the client for the particular application from the centralized data store in response to the input, and provides the relevant diagnostic signals (directly, indirectly, or both) through corresponding sections of the user interface associated with the configuration of diagnostics. In some instances, the computing system can also use the relevant diagnostic signals to generate insights and actions. For example, timestamps of the relevant diagnostic signals stored over time allows the computing system to make historical trends or predictions (e.g., using an intelligence engine), which in turn, allows the system to highlight significant changes in data and identify potential causes along with providing the relevant diagnostic signals.

As such, the system can automatically generate diagnostic signals across multiple applications for a client account reliably and in a standardized way, which increases the confidence of the freshness and relevance of the diagnostic signals, makes it easier to implement changes in processing of the data simultaneously for the multiple applications, and integrates timestamps which allows new information to be generated.

Examples of the disclosure provide several technical effects, benefits, or improvements in computing technology to determine conversion diagnostic metrics. The techniques described herein reduce complexity of the systems needed to determine conversion diagnostic metrics for separate applications. For example, by using a single pipeline for processing data from multiple features, separate processing pipelines for separate applications are no longer required, which means that updates to the processing techniques only need to be implemented at a single pipeline instead of in multiple pipelines. Moreover, by using a single pipeline, a common data format for the generated signals can be provided, which allows for a common, embeddable diagnostics user interface to be used across applications. Computing resources are also conserved, as separate pipelines do not need to be developed and maintained, and as diagnostic signals are no longer redundantly computed across different applications. Moreover, the reliability and freshness of the diagnostic signals is improved. For instance, as the feature data is pulled at a known interval from the back-end sources for the features, the age of the feature data is known and can be used to provide new insights.

From an end-user's perspective, the examples of the disclosure provide several benefits. For instance, the user is provided a summary for each diagnostic in use for a particular application that indicates when a related feature is in use, what features should be implemented, if a feature is having issues, how to fix issues when they occur, if the issues are resolved, if the diagnostics are still up-to-date, and how changes impact the overall diagnostics. Additionally, by providing the diagnostics in a consistent and standardized manner across applications, a user can more easily and quickly understand the provided diagnostics.

With reference now to the Figures, example embodiments of the present disclosure will be discussed in further detail.

FIG. 1 depicts an example system 100 for generating conversion measurement diagnostics for different measurement applications based on different conversion features. For instance, the system 100 can include different conversion features that can be enabled to collect data in addition to, or in place of, third-party cookies. For instance, conversion features can help measure and analyze specific user interactions with content items after serving. A conversion feature can include, for instance, code configurable to perform particular tasks, like measurement, record keeping, or the like, for a client. Once the code is configured, the code can be assigned or implemented on certain webpages, websites, application interfaces, or the like of the client to begin performing the configured task(s). The feature data for a particular conversion feature generated as a result of the configured task(s) being performed can be stored in a respective back-end storage device for the conversion feature. The stored feature data can be used to generate measurement diagnostics across different measurement applications.

For example, a first conversion feature can be a conversion feature configured to receive first-party customer data (e.g., clicks, completed interactions, time on page, email addresses, names, home addresses, phone numbers, or the like) from a customer website when a customer completes a conversion or creates an account, then hash the first-party customer data according to privacy settings for sharing with applications. In some instances, the first-party data is captured by the first feature using conversion tracking tags. Conversion tracking tags are snippets of code that measure user activity on a website and are used to send data to different applications. In some instances, a single tag associated with the client can be used in one or more locations to send data to multiple applications. The hashed first-party data can be stored in a back-end storage device BE1 associated with the first conversion feature.

As a further example, a second conversion feature can be configured to import offline conversion data. For instance, when an online content item display ends in an interaction in the offline world, such as at a physical location or over the phone, first-party data collected during the offline interaction (e.g., an email address, name, home address, phone number, time of day, location of interaction, or the like) can be uploaded to the feature (e.g., directly or via an external client relationship manager system). The offline conversion data can be stored in a back-end storage device BE2 associated with the second conversion feature.

As another example, a third conversion feature can be configured to communicate consent choices. For instance, the third conversion feature can communicate users' cookie or app identifier consent status and adjust tag behavior across the pages of the client website to respect users' choices. For example, if one or more privacy consent questions are provided to a user via the client website, but no user consent is received from the user or if user consent is explicitly denied by the user, the third conversion feature can prevent tags from transmitting any data from the website or can only permit cookie-less data to be transmitted until/unless consent is received. The consent data can be stored in a back-end storage device BE3 associated with such a third conversion feature.

It should be appreciated that such examples of conversion features are not exhaustive. For instance, any suitable number of further features can additionally, or alternatively, be used with the system 100 (e.g., as denoted by back-end storage devices BEN in FIG. 1).

A user can be provided with controls allowing the user to make an election as to both if and when conversion features described herein can enable collection of user information (e.g., email address, name, home address, phone number, time of day, location of interaction, current location, or the like), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

The data from different features is used, individually or in combination(s), by different content-related applications to generate diagnostics for measuring the success of or for managing content serving in different ways. For instance, a first example application A1 can be configured to provide information for impact of monitored content serving relative to expenditures for serving the content, site traffic monitoring, or the like. A second example application A2 can be configured for setting up and managing content serving across search results for a search engine by the provider associated with the system 100 or a separate provider. A third example application A3 can be configured for managing content serving other than search-result-based content serving. However, it should be appreciated that such example applications are not exhaustive. Any other suitable number of content-related applications can instead, or additionally, be used with the disclosed system 100 (e.g., as denoted by App. N AN in FIG. 1). For instance, an application can be used for programmatic selection of content delivery slots to automate media interactions across multiple content delivery slot exchange platforms and allow for advanced audience serving and selecting and real-time selections.

In some instances, the applications A1, A2, A3, AN can be part of a suite of applications of a particular provider, where the provider may also include, for instance, a web browser application. As such, a user identifier (e.g., email address, phone number, mailing address, full name, username, etc.) for a user interacting with content provided using one or more applications (e.g., one or more of applications A1, A2, A3, AN) can be matched to a user identifier associated with a unique user administration identification code for a user account of the user used by the provider across the different applications of the provider or with applications not hosted by the provider that allow use of such user account for identification. In such instances, additional back-end data matching the user identifier with the user administration identification code can be available that allows for additional conversion detection for other actions using the user administration identification code. Similarly, the percentage of customers in an uploaded customer list with information that matches (e.g., indirectly, using hashed information) with user accounts of the provider (e.g., as determined by comparing similarly hashed information for the user accounts) can be provided as additional back-end data, which can be used, for example, as an indicator of whether the customer list is uploaded in the right way.

Conventionally, a separate pipeline for processing the feature data from the back-end storage device(s) BE1, BE2, BE3, BEN is developed for each content-related application to generate relevant diagnostic signals for measuring different diagnostics. However, different content-related applications can ultimately create a substantially similar or the same diagnostic signal from the feature data, which means that the diagnostic signals are redundantly generated. Moreover, while the same diagnostic signal can essentially be generated by the different pipelines, the different pipelines can process using different formats or structures (e.g., Structured query language (SQL), noSQL, or the like) or specific wording/language for the application, which prevents the diagnostic signals from being easily shared across applications without further processing. Additionally, conventional approaches rely on the back-end storage devices BE1, BE2, BE3, BEN to push updated feature data to the separate pipelines. However, the pushes do not occur at regular intervals, and sometimes do not include timestamps. As such, the diagnostic signals can be unreliable, as they can be generated from out-of-date information.

Accordingly, the system 100 provided herein generally includes a single, common data layer 102 which can be used to process raw feature data from the back-end storage devices BE1, BE2, BE3, BEN for all of the relevant content-related applications A1, A2, A3, AN to create, store, and refresh diagnostic signals. For instance, the common data layer 102 can include a processing pipeline 104 that is configured to pull or request feature data from back-end storage devices BE1, BE2, BE3, BEN for different features at a configured interval. For example, the configured interval can be daily, twice daily, weekly, or any other suitable interval. In some instances, the configured interval can be adjusted based on client preferences for freshness, cost, or the like. In further examples, back-end storage device(s) BE1, BE2, BE3, BEN can indicate when changes, updates, additions, or the like occur to the processing pipeline 104 or common data layer 102, which can trigger the processing pipeline 104 or common data layer 102 to pull the information from the back-end storage device(s) BE1, BE2, BE3, BEN. Such information can still be timestamped at the time the data is pulled or based on the indication sent from the back-end storage device(s) BE1, BE2, BE3, BEN to the processing pipeline 104 or common data layer 102.

The common data layer 102 can receive the feature data stored in the back-end storage devices BE1, BE2, BE3, BEN from the pipeline 104 at the configured interval, then process the data according to predetermined logic for each available diagnostic for a plurality of applications A1, A2, A3, AN. For instance, each available diagnostic can have a plurality of signal statuses (e.g., excellent, good, needs attention, no recent data) which are determined by the existence of a particular type or number of respective alerts. Alerts are defined by respective, specific criteria (predetermined logic) that the feature data must meet to satisfy each of the plurality of signal statuses. The meaning of the statuses can vary across applications.

For example, a diagnostic defined for one or more of the applications A1, A2, A3, AN that monitors offline conversion feature data from back-end storage device BE2 can include criteria for an alert when a threshold percentage of events in the offline conversion feature data have an invalid conversion time (e.g., occurred before content was served), an alert when a threshold percentage of events have calls that are too old, an alert if click events in the offline conversion feature data are too recent (e.g., within 30 days of offline conversion and could result in returns), or the like. Similar alert criteria for multiple applications could cause an alert if a threshold number of the events in the feature data have an incorrect data format, an alert if a conversion value (e.g., weight) is missing, an alert if a site is missing a conversion tag, an alert if a site has an incorrect conversion tag, an alert if a threshold number of pages do not have the conversion tag, or the like. It should be understood that the examples of criteria provided herein are not exhaustive. Any suitable number and type of criteria can be provided for each status.

The common data layer 102 can evaluate the feature data against all of the criteria to determine the alerts that are present. Based on the alerts, the common data layer 102 can also determine what signal status is present for each diagnostic. The common data layer 102 can then store the diagnostic signals (e.g., alerts or signal status) with timestamps. As will be described below, the stored diagnostic signals are ready to be served for each diagnostic in the different applications and the timestamps can be used to generate new information, not previously available. It should be appreciated that the common data layer 102 is scalable, and distributed across multiple data centers such that data stored in the common data layer 102 is available in the event of an entire data center failure. Thus, the common data layer 102 provides a reliable source for diagnostic signals, as the freshness of the feature data is known, and the diagnostic signals are always available.

Moreover, it should be appreciated that, because the common data layer 102 is used to process the back end data according to predetermined logic for each available diagnostic for the plurality of applications A1, A2, A3, AN, any updates to the predetermined logic establishing the criteria for one or more alerts or diagnostic statuses only needs to be updated at one location (i.e., at the common data layer 102). As such, certain updates that can be applicable across multiple alerts, diagnostic statuses, or applications can be easily and quickly applied, and with a smaller chance of error.

The system can further include a unified application programming interface (API) 106 that allows the applications A1, A2, A3, AN or components thereof to communicate with each other and with the common data layer 102. In some instances, the unified API 106 can interact directly with some back end data. For instance, in one example, one or more diagnostic signals can be ready to serve for a diagnostic of an application (e.g., one or more of the applications A1, A2, A3, AN) based on at least some of the feature data from a back end device (e.g., backend database BE1, backend database BE2, or the like) by the unified API 106. As such, certain feature data of one or more back end devices can be processed by the common data layer 102, while some feature data of the same back end device(s) can alternatively, or additionally, be directly available by the API 106.

Each of the applications A1, A2, A3, AN has a respective application or product user interface 108 from which an embeddable diagnostics user interface 110 is accessible. The embeddable diagnostics user interface (UI) 110 can have a common framework that can be easily adaptable for use across the different applications A1, A2, A3, AN. In some instances, as illustrated, the embeddable diagnostics UI 110 includes an overview customized based on the diagnostics enabled for each application A1, A2, A3, AN. For instance, the table shown in FIG. 2 illustrates the diagnostic configuration 112 (e.g., enabled, not enabled, do not enable) of each diagnostic for each application A1, A2, A3, AN. For example, as shown in FIG. 2, the first, second, and fourth diagnostics are enabled for the first application A1, but the third diagnostic is not enabled, and the fifth and sixth diagnostics are marked "Do not enable." For the second application A2, the first, second, and sixth diagnostics are fourth, the sixth diagnostic is not enabled, and the third and fifth diagnostics are marked "Do not enable." For the third application A3, the first, second, and fifth diagnostics are enabled, while the third, fourth, and sixth diagnostics are marked "Do not enable." Additionally, for the further application AN, the first, second, fourth, and fifth applications are enabled, while the third and sixth diagnostics are marked "Do not enable."

While six diagnostics are shown in FIG. 2, it should be appreciated that any other suitable number of diagnostics can instead be defined and used, such as more or less than six diagnostics. Moreover, it should be appreciated that any suitable combination of diagnostics being enabled, not enabled, or marked "Do not enable" can be provided for each application. For instance, while not shown, some applications can have all diagnostics enabled.

The overview of the embeddable diagnostics UI 110 can include one or more interface elements for each of the enabled diagnostics for display within the particular application. For example, as shown in FIG. 2, the first, second, and fourth diagnostics are enabled for the first application A1, but the third diagnostic is not enabled, and the fifth and sixth diagnostics are marked "Do not enable." Correspondingly, as shown in FIG. 3A, an overview section of the embeddable diagnostics UI 110 of the product UI 108 for the first application A1 includes separate interface elements (e.g., cards, panels, or the like) for each of the enabled diagnostics for the first application A1 (e.g., the first diagnostic, the second diagnostic, and the fourth diagnostic). For instance, a first interface element D1 is provided for the first diagnostic, a second interface element D2 is provided for the second diagnostic, and a fourth interface element D4 is provided for the fourth diagnostic.

It should be appreciated that, in some instances, the diagnostic configuration for one or more of the applications can change based on client actions. In such instances, the embeddable diagnostics UI 110 for such application(s) can change to reflect the changes in the diagnostic configuration. For instance, if a diagnostic for an application becomes enabled, a corresponding interface element can be added to the embeddable diagnostics UI 110. Similarly, if a diagnostic for an application becomes disabled or no longer able to be enabled (e.g., marked "Do not enable"), a corresponding interface element can be removed or hidden from the embeddable diagnostics UI 110. For example, if the third diagnostic becomes enabled for the first application A1, then an interface element D3 for the third diagnostic becomes additionally available in the embeddable diagnostics UI 110 for the product UI 108 for the first application A1, as shown in FIG. 3B.

The interface elements (e.g., interface elements D1, D2, D3, D4) for a respective application can be used to provide respective diagnostic signals (e.g., diagnostic status or alerts) for each of the diagnostics. For instance, the unified API 106 can use the diagnostic configuration 112 to surface the relevant signals to the proper diagnostics for each application via the embeddable diagnostics UI 110. For example, the first interface element D1 indicates a percentage of data events that are affected by the diagnostic (e.g., as both a percentage and a bar graph interpretation) as an indication of the diagnostic status in addition to the diagnostic status (e.g., "Needs attention). Moreover, the unified API 106 can properly vary the diagnostic status labels for diagnostics across applications (e.g., "No issues" can be used in place of "All Active!" for some applications). While not particularly illustrated, it should be appreciated that, in some instances, one or more of the interface elements can further include the alerts for the respective diagnostic.

The interface elements can additionally be interacted with to provide further information regarding the associated diagnostic signals. For example, when the interface element D3 for the third diagnostic in FIG. 3B is interacted with, a further interface 111 of the embeddable diagnostics UI 110 is shown, as in FIG. 4. The further interface 111 of the embeddable diagnostics UI 110 can similarly include a common UI framework that can be used across different diagnostics. For instance, the further interface 111 includes a priority section 111A that includes diagnostic status information (e.g., "Needs attention"), a summary of the scope of the status (e.g., "Affects #events"), and corresponding alerts for the status (e.g., Issue 1, Issue 2). The priority section 111A can have one or more quick action elements 113, each of which is configured to perform a preconfigured action (e.g., downloading or email forwarding of the alerts). The further interface 111 also includes a history section 111B that includes historical trends (e.g., graph) for the diagnostic based on timestamps of the relevant diagnostic signals stored over time in the common data layer 102. As the feature data is pulled by the common data layer 102 at regular intervals, timestamps are assigned to the generated diagnostic signals, which allows trends in the diagnostic signals to be monitored over time in a reliable manner. The further interface 111 additionally includes an impact section 111C which provides an indication (e.g., impact score) of the current actual performance for a particular diagnostic action (e.g., Action 1 is associated with 51-100% success). The ratings or impact scores in the impact section 111C change over time as a user makes changes based on the alerts. The respective further interface 111 provided for different diagnostics can include any suitable combination of the interface sections 111A, 111B, 111C or any other suitable interface sections. In some instances, the impact section 111C can indicate an uplift for a particular feature (e.g., how many more conversions were received since enabling a feature, changing a setting, or the like).

Referring back to FIGS. 3A and 3B, in some instances, the embeddable diagnostics UI 110 includes an education section 116 and a recommended setup section 118. The education section 116 can provide quick access (e.g., links) to introductory information about the diagnostic tool. The education section 116 can optionally be hidden based on user preference. The recommended setup section 118 recommends actions that can be taken by a user (e.g., a data manager for the client account) based at least in part on the diagnostics. For instance, as shown in FIG. 3A, two actions (e.g., a first action 118A, a second action 118B) are recommended in the recommended setup section 118. The first action 118A is an example of an action associated with diagnostic signals from one of the diagnostics, and therefore has a link labeled "Get started", which can take a user to the correct location to change feature settings/setup or to information on how to change feature settings/setup to improve the diagnostic. While not particularly shown, the first action 118A can also include a summary of the recommended action (e.g., "Measure values of your conversions: Measure values of your conversions based on what matters most to your business", "Start measuring in-app conversions: Understand which clicks lead to valuable customer actions in your app", or the like). The second action 118B is an example of an action associated with diagnostics that are not enabled, but could be, for a particular application. For instance, as discussed above, the third diagnostic is not enabled for the first application A1 in FIGS. 2 and 3A but is able to be enabled (e.g., is not labeled "Do not enable" in FIG. 2). As such, the second action 118B includes a link or interface element labeled "Apply" which can direct a user to an option to directly (or indirectly) enable or apply the third diagnostic for the first application A1. Once the third diagnostic is enabled, the second action 118B can automatically be resolved and removed from the recommended setup section 118 as shown in FIG. 3B. As such, stale recommendations can be avoided. Moreover, in some instances, if no recommended actions are available, the recommended setup section 118 can be automatically hidden. It should be appreciated that any number of suitable actions can be recommended in the recommended setup section 118, such as zero suitable actions (where none are applicable), one action, three actions, or the like.

Figure 4:
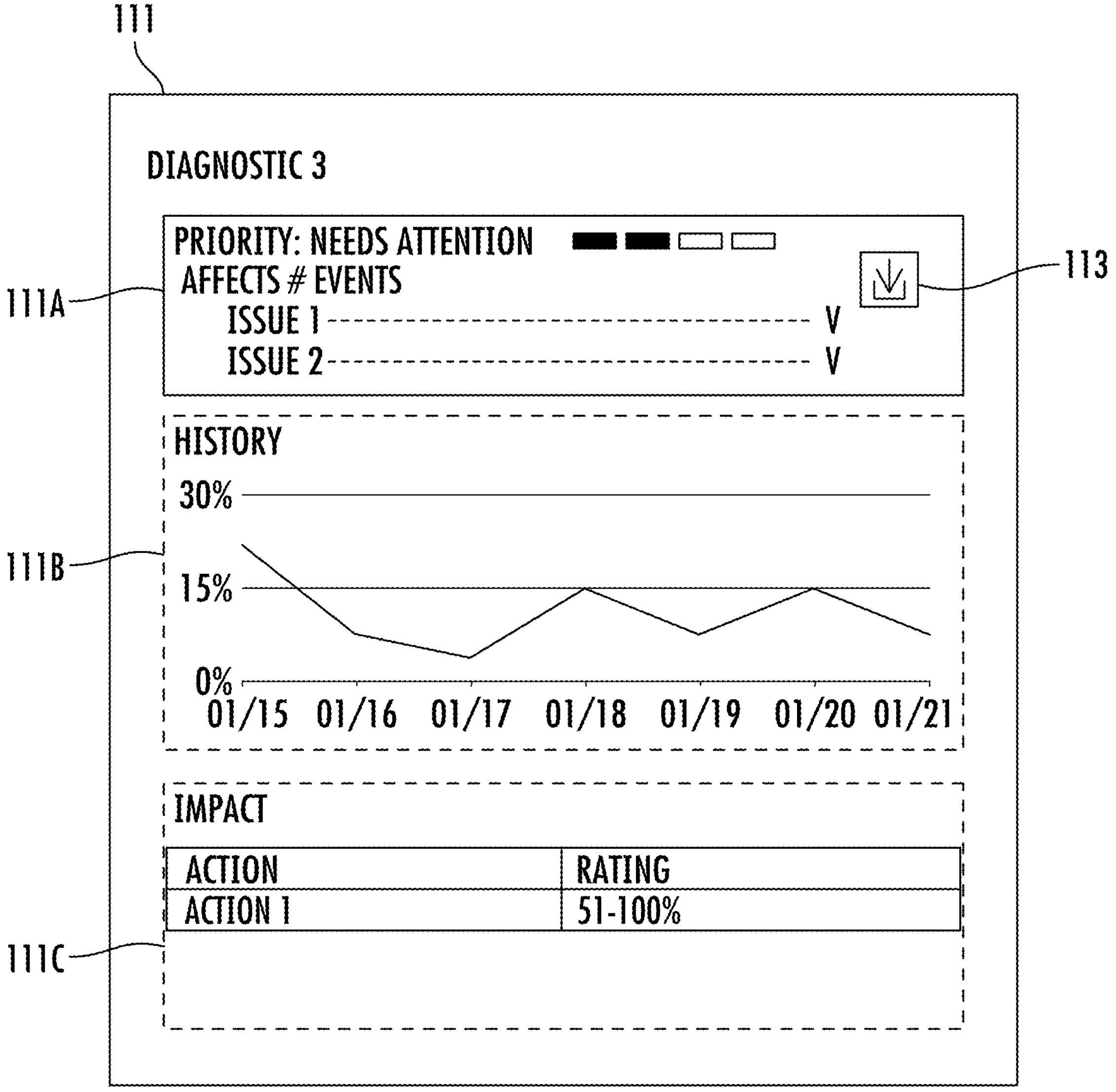
FIG. 4 depicts an example conversion diagnostic from one of the summaries from FIG. 3B according to example embodiments of the present disclosure.

The actions provided in the recommended setup section 118 in FIGS. 3A, 3B and the historical trends provided in the history interface element 111B of the further interface 111 shown in FIG. 4, can be enabled, in part, by one or more optional intelligence engines 114 (FIG. 1). Each intelligence engine 114 can generally include a data repository, a prediction system, an insight system, or an action system. The data repository can be configured to collect data (e.g., from the common data layer 102). The prediction system can be configured to analyze the data. For instance, the prediction system can include a layer of artificial intelligence including a plurality of machine-learning models or other predictive algorithms optimized for the end applications (e.g., applications A1, A2, A3, AN). The insight system can be configured to generate one or more insight(s) based, at least in part, on the analysis, and the action system can be configured to initiate an action based, at least in part, on the analysis or insight(s). As such, the intelligence engine(s) 114 can generate new or additional insights or recommended actions beyond what is strictly defined for processing by the common data layer 102.

In some instances, the intelligence engine(s) 114 can additionally be configured to respond to interactions from users with the UI(s) 110. For instance, if a user toggles certain features on or off, or to no longer show a type of diagnostic, recommendation, or the like, the intelligence engine(s) 114 can be configured to adjust the UI(s) 110 for the user or other users for the application or other applications to subsequently correspond to the user's interactions. For instance, if a user hides the education section 116 for one application, the intelligence engine(s) 114 can be configured to decide when to automatically hide the education section 116 for another application, such as based on the overlap in scope (e.g., threshold number of overlapping diagnostics) between applications.

Additionally, referring back to FIGS. 3A and 3B, in some instances, the embeddable diagnostics UI 110 includes different tabs for switching between different information summary pages associated with the application. For instance, the embeddable diagnostics UI 110 includes a first tab 120A associated with goals for the particular application, and a second tab 120B associated with the diagnostics associated with the goals (e.g., the view shown in FIGS. 3A and 3B). In some instances, the recommendations in the recommended setup section 118 and the overview sections of the embeddable diagnostics UI 110 can be filtered according to certain diagnostic features (e.g., offline conversion-related diagnostics only, or the like).

The system 100 therefore prevents diagnostic signals from being redundantly computed and allows signals to be easily shareable between applications. Further, updates to how diagnostic signals are generated from the feature data for multiple applications can be implemented in a single location. Moreover, the feature data is pulled from the features ad hoc on a regular basis and timestamped, which allows the signals to be fresher and trackable. From an end-user's perspective, the embeddable diagnostics UI 110 makes it easier to tell when a feature is/is not in use for a particular application, what features should be implemented for a particular application, if a feature is having issues, how to fix issues when they occur, if the issues are resolved, if the diagnostic measurements are up-to-date, and how changes impact the overall diagnostic measurements.

Figure 5:
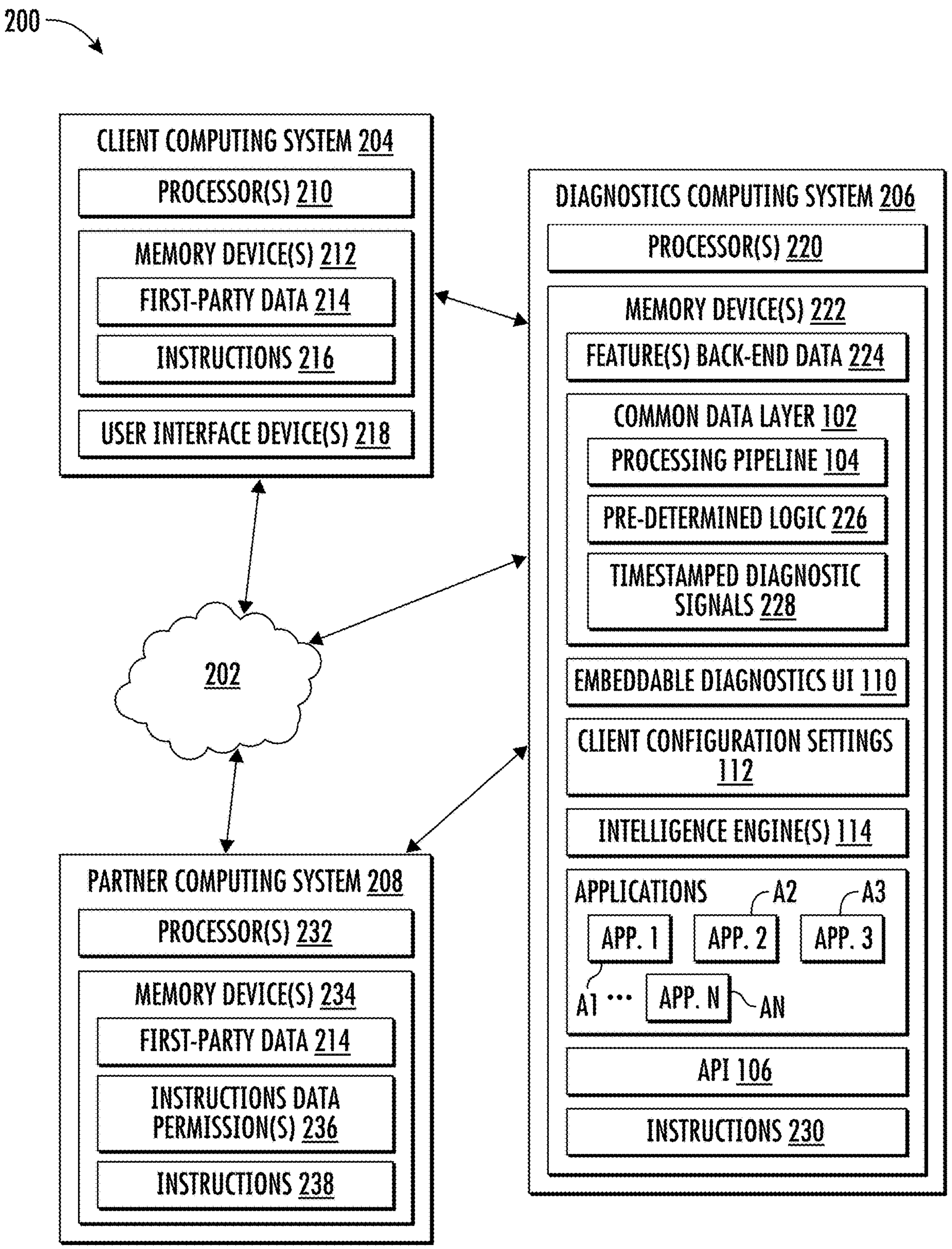
FIG. 5 depicts a block diagram of a system for generating conversion measurement diagnostics according to example embodiments of the present disclosure.

FIG. 5 depicts a block diagram of a system 200 for generating conversion measurement diagnostics according to example embodiments of the present disclosure. The system 200 can include a number of computing devices and systems that are communicatively coupled over a network 202. For instance, the system 200 can include one or more client computing systems or devices 204, one or more diagnostic computing systems or devices 206, and, optionally, one or more partner computing systems or devices 208 that are communicatively coupled over the network 202. The network 202 can be any type of communications network, such as a local area network (e.g., intranet), wide area network (e.g., Internet), or some combination thereof and can include any number of wired or wireless links. In general, communication over network 202 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL). Network 202 can also be implemented via a system bus.

The client computing system(s) 204 can be any type of computing device, such as, for example, a personal computing device (e.g., laptop or desktop), a mobile computing device (e.g., smartphone or tablet), a gaming console or controller, a wearable computing device, an embedded computing device, or any other type of computing device. The client computing system(s) 204 includes one or more processors 210 and one or more memory devices 212. The processor(s) 210 can be any suitable processing device (e.g., a processor core, a microprocessor, an ASIC, an FPGA, a controller, a microcontroller, or the like) and can be one processor or a plurality of processors that are operatively connected. The memory device(s) 212 can include one or more non-transitory computer-readable storage media, such as RAM, ROM, EEPROM, EPROM, flash memory devices, magnetic disks, or the like. The memory device(s) 212 can collectively store data, such as first-party data 214, or the like. The first-party data 214 can include, for example, offline conversion data collected during an offline interaction (e.g., an email address, name, home address, phone number, time of day, location of interaction, or the like). Other data stored by the memory device(s) 212 can include instructions 216 which are executed by the processor(s) 210 to cause the client computing system(s) 204 to perform operations. For instance, the instructions 216 can allow the client computing system(s) 204 to perform actions related to client website management, content delivery management, or the like. For instance, suitable actions can include sending data to the diagnostic computing system(s) 206 or the partner computing system(s) 208, accessing websites (e.g., using an internet browser), media files, or any other types of content, or any other suitable actions.

The client computing system(s) 204 can also include one or more user interface device(s) 218 that allows a user to provide inputs to the client computing system(s) 204 or be provided outputs from the client computing system(s) 204. For example, the user interface device(s) 218 can include touch-sensitive input devices (e.g., a touch-sensitive display screen or a touch pad) that is sensitive to the touch of a user input object (e.g., a finger or a stylus). The touch-sensitive component can serve to implement a virtual keyboard. Other example user input devices include keypads, touchpads, knobs, buttons, sliders, switches, mice, microphones, or the like by which a user can provide user input. The user interface device(s) 218 can also include suitable output devices, such as display screens, speakers, or the like for providing feedback or other content to a user of the client computing system(s) 204.

The diagnostic computing system(s) 206 can perform many of the processes described above with reference to FIGS. 1-4. For instance, the diagnostic computing system(s) 206 can be configured to generate diagnostic signals for helping users measure the performance of different features used across different content-related applications. In this regard, the diagnostic computing system(s) 206 includes one or more processors 220 and one or more memory devices 222. Similar to as described above for the processor(s) 210, the processor(s) 220 can be any suitable processing device (e.g., a processor core, a microprocessor, an ASIC, an FPGA, a controller, a microcontroller, or the like) and can be one processor or a plurality of processors that are operatively connected. The memory device(s) 222 can include one or more non-transitory computer-readable storage media, such as RAM, ROM, EEPROM, EPROM, flash memory devices, magnetic disks, etc., or the like. The memory device(s) 222 can collectively store data. For instance, the memory device(s) can, in some instances, store back-end data from different feature(s) 224, such as the data from the different back-end devices BE1, BE2, BE3, BEN discussed with reference to at least FIG. 1. The memory device(s) 222 can store, or otherwise access, the common data layer 102 having the processing pipeline 104, any predetermined logic 226, and the stored timestamped diagnostic signals 228 generated by the common data layer 102 based at least in part on the back-end data from different feature(s) 224 pulled by the processing pipeline 104 at regular intervals and the predetermined logic 226, as discussed with regards to at least FIG. 1. Further, in some instances, the memory device(s) 222 can store a framework for the embeddable diagnostics UI 110 and the associated client configuration settings 112, as discussed above with reference to FIGS. 1-4. Furthermore, in some instances, the memory device(s) 222 can store different applications and their respective data (e.g., first application A1, second application A2, third application A3, further application(s) AN). Additionally, in some instances, the memory device(s) 222 can store API (e.g., the API 106 discussed with reference to FIGS. 1-4) necessary for allowing the components of the diagnostic computing system(s) 206 to communicate with each other and with other components of the system 200.

In some implementations, the memory device(s) 222 of the diagnostic computing system(s) 206 can store or include the intelligence engine(s) 114, as discussed above with reference to FIGS. 1-4. The intelligence engine(s) 114 can include one or more machine-learned models. For example, the machine-learned models can be or can otherwise include various machine-learned models such as neural networks (e.g., deep neural networks) or other types of machine-learned models, including non-linear models or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, one or more machine-learned models can be received from (e.g., over network 202), stored in the computing device memory 222, and used or otherwise implemented by the one or more processors 220. In some implementations, the diagnostic computing system(s) 206 can implement multiple parallel instances of a machine-learned model 20.

Additionally, or alternatively, one or more machine-learned models can be included in or otherwise stored and implemented by the client computing system 200 that communicates with the diagnostic computing system(s) 206 according to a client-server relationship.

The machine-learned models described in this specification can be used in a variety of tasks, applications, or use cases. Although described throughout with respect to example implementations for applications in medical domains, it is to be understood that the techniques described herein can be used for other tasks in various technological fields.

In some implementations, the input to the machine-learned model(s) of the present disclosure can be statistical data (e.g., analytics data, performance metrics, diagnostic signal(s) 228, back-end data 224, user interactions, or the like). Statistical data can be, represent, or otherwise include data computed or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the machine-learned model(s) can be configured to perform a task that includes encoding input data for reliable or efficient transmission or storage (or corresponding decoding).

The diagnostic computing system(s) 206 or the client computing system 204 can train example embodiments of a machine-learned model (e.g., including models of the intelligence engine(s) 114) using a training pipeline (e.g., an unsupervised pipeline, a semi-supervised pipeline, etc.). In some embodiments, the diagnostic computing system(s) 206 or the client computing system 204 can train example embodiments of a machine-learned model (e.g., including models of the intelligence engine(s) 114) using analytics data, performance metrics, diagnostic signal(s) 228, back-end data 224, user interactions, or the like. In some embodiments, the diagnostic computing system(s) 206 or the client computing system 204 can train example embodiments of a machine-learned model (e.g., including models of the intelligence engine(s) 114) using a pre-training pipeline by interaction with a training computing system. In some embodiments, the training computing system can be communicatively coupled over the network 202. The training computing system can be separate from the diagnostic computing system(s) 206 or can be a portion of the diagnostic computing system(s) 206.

The model trainer can include a training pipeline for training machine-learned models using various objectives. The model trainer can include computer logic utilized to provide desired functionality. The model trainer can be implemented in hardware, firmware, or software controlling a general-purpose processor. For example, in some implementations, the model trainer includes program files stored on a storage device, loaded into a memory, and executed by one or more processors. In other implementations, the model trainer includes one or more sets of computer-executable instructions that are stored in a tangible computer-readable storage medium such as RAM, hard disk, or optical or magnetic media.

The memory device(s) 222 can further store instructions 230 which are executed by the processor 220 to cause the diagnostic computing system(s) 206 to perform operations. For instance, the instructions 230 can allow the diagnostic computing system(s) 206 to perform actions related to client website management, content serving management, or the like. For instance, suitable actions can include running the applications A1, A2, A3, AN, and providing access (e.g., user interface(s)) for interacting with the applications A1, A2, A3, AN (e.g., to change views, configuration settings 112, or the like). Suitable actions can also include performing the generation or refreshing of diagnostic signals as described above with reference to FIGS. 1-4. For instance, the actions can include requesting the data 224 from each of the back-end devices BE1, BE2, BE3, BEN be pulled through the same pipeline 104 at configured intervals, processing the received back-end data 224 according to the predetermined logic 226 established for each available diagnostic across the different content-related applications A1, A2, A3, AN to determine all diagnostic signals that could be potentially used across one or more of the applications, and storing the diagnostic signals. The actions can further include, in response to a user accessing or otherwise requesting diagnostics from within a particular application, pulling the stored diagnostic signals associated with enabled diagnostics for the particular application in accordance with the client configuration settings 112 and displaying the pulled diagnostic signals through the embeddable diagnostics UI 110 via the particular application. Moreover, the actions can further include evaluating the pulled diagnostics with the intelligence engine(s) 114 to create recommended setup actions or new insights (e.g., historical trends) which can also be surfaced through the embeddable diagnostics UI 110.

In some implementations, the diagnostic computing system(s) 206 includes, or is otherwise implemented by, one or more server computing devices. In instances in which the diagnostic computing system(s) 206 includes plural server computing devices, such server computing devices can operate according to sequential computing architectures, parallel computing architectures, or some combination thereof.

When the first-party data 214 is not directly uploaded from the client computing system(s) 204 to the feature back-ends, the partner computing system(s) 208 can be configured to act as a client relationship management (CRM) system, where the first-party data 214 is provided from the client computing system(s) 204 to the partner computing system(s) 208, and the partner computing system(s) 208 then provides the first-party data 214 (with or without alterations) to the diagnostic computing system(s) 206. In this regard, the partner computing system(s) 208 similarly includes one or more processors 232 and one or more memory devices 234. Similar to as described above for the processor(s) 210, 220, the processor(s) 232 can be any suitable processing device (e.g., a processor core, a microprocessor, an ASIC, an FPGA, a controller, a microcontroller, or the like) and can be one processor or a plurality of processors that are operatively connected. The memory device(s) 234 can include one or more non-transitory computer-readable storage media, such as RAM, ROM, EEPROM, EPROM, flash memory devices, magnetic disks, or the like. The memory device(s) 234 can collectively store data. For instance, the memory device(s) 234 can, in some instances, store the first-party data 214 received (or pulled) from the client computing system(s) 204. Moreover, the memory device(s) 234 can, in some instances, store first-party data permissions 236 for sharing the first-party data 214 with other computing systems (e.g., the diagnostics computing system(s) 206). For example, the first-party data permissions 236 can indicate what types of first-party information can be shared by the partner computing system(s) 208 with other computing systems, what information must be altered, or the like.

The memory device(s) 234 can further store instructions 238 which are executed by the processor(s) 232 to cause the partner computing system(s) 208 to perform operations. For instance, the instructions 238 can allow the partner computing system(s) 208 to process the first-party data 214 according to the first-party data permission(s) 236 (e.g., hashing email addresses, phone numbers, names, or the like), then send the altered first party data to the diagnostics computing system(s) 206 (e.g., to the back-end device(s) BE1, BE2, BE3, BEN).

Figure 6:
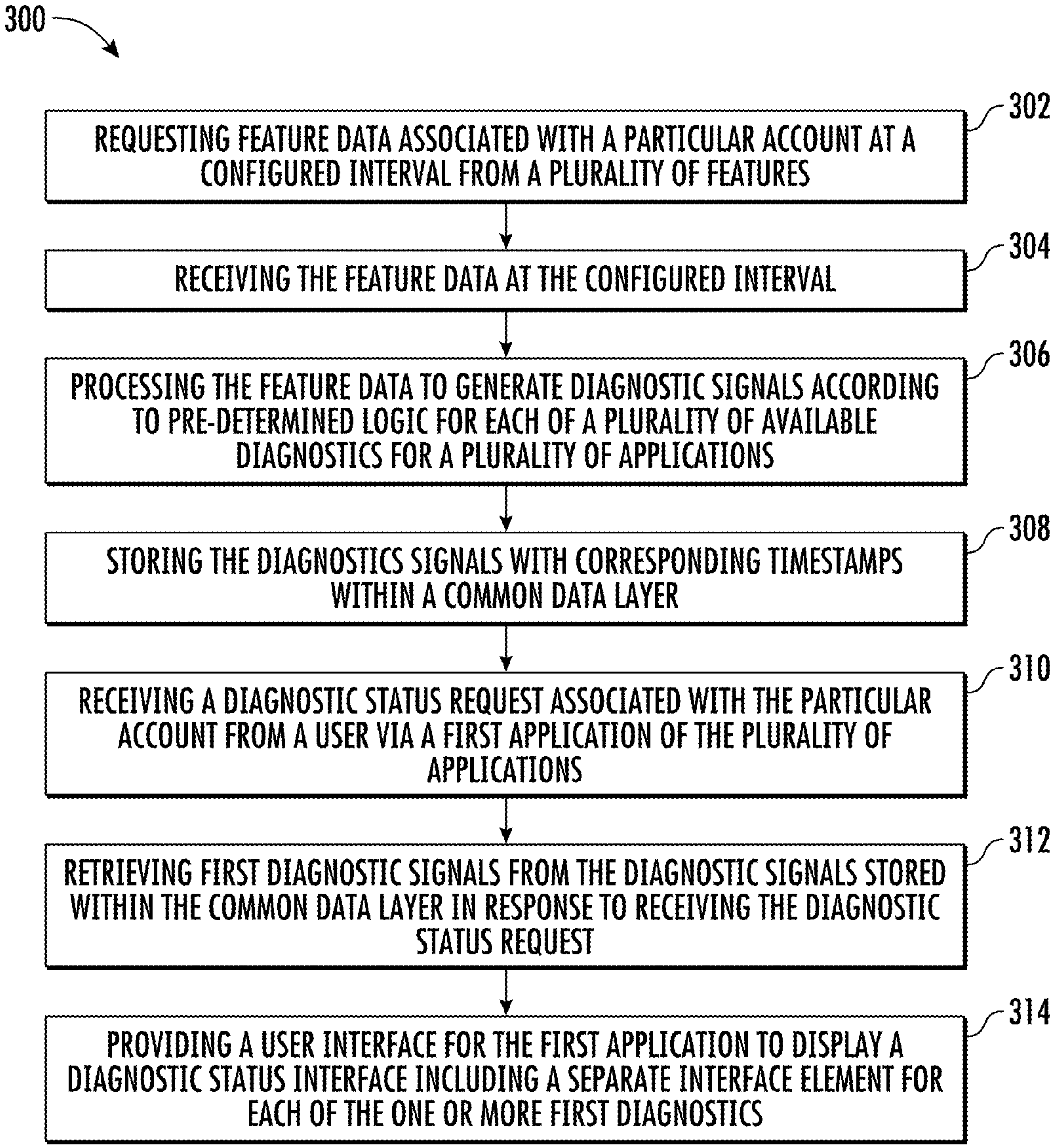
FIG. 6 depicts a flow diagram of an example method for generating suggested assets according to example embodiments of the present disclosure.

FIG. 6 depicts a flow diagram of an example method 300 for generating suggested assets according to example embodiments of the present disclosure. One or more portion(s) of example method 300 can be implemented by a computing system that includes one or more computing devices such as, for example, computing systems described with reference to the other figures. Each respective portion of example method 300 can be performed by any (or any combination) of one or more computing devices. Moreover, one or more portion(s) of example method 300 can be implemented on the hardware components of the device(s) described herein, for example, to train one or more systems or models. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 6 is described with reference to elements/terms described with respect to other systems and figures for exemplary illustrated purposes and is not meant to be limiting. One or more portions of example method 300 can be performed additionally, or alternatively, by other systems.

As shown in FIG. 6, at (302), the method 300 can include requesting feature data associated with a particular account from a plurality of features. For instance, as indicated above, feature data associated with a particular account can be requested from the back-end sources BE1, BE2, BE3, BEN at a configured interval (e.g., daily), where each of the back-end sources BE1, BE2, BE3, BEN is associated with a respective feature of a plurality of features (e.g., offline conversions, tag-based conversions, user consent, or the like) and is indicative of interactions associated with content items.

At (304), the method 300 can include receiving the feature data at the configured interval. For example, as discussed above, the feature data can be pulled from the back-end sources through the pipeline 104 at the configured interval (e.g., daily).

The method 300, at (306), can include processing the feature data to generate diagnostic signals according to predetermined logic for each of a plurality of available diagnostics for a plurality of applications. For instance, as discussed above, the feature data can be run through predetermined logic to determine whether the feature meets certain criteria for alerts associated with each of the diagnostics available across the plurality of applications. The alerts can be used to determine diagnostic signals (e.g., diagnostic statuses).

The method 300, at (308), can include storing the diagnostic signals with corresponding timestamps within a common data layer. For example, as described above, the diagnostic signals can be stored with corresponding timestamps within the common data layer 102, as the feature data is pulled at known time intervals.

The method 300, at (310), can include receiving a diagnostic status request associated with the particular account from a user via a first application of the plurality of applications. For instance, a diagnostic status request can be received when a user associated with the particular client account clicks on a user interface element within the first application, where the user interface element is associated with requesting the diagnostic status for the diagnostics for the first application.

The method 300, at (312), can include retrieving first diagnostic signals from the diagnostic signals stored within the common data layer in response to receiving the diagnostic status request, each of the first diagnostic signals being associated with one or more first diagnostics of the plurality of available diagnostics, the one or more first diagnostics being enabled for the first application. For instance, first diagnostic signals can be retrieved from the common data layer 102 based on the diagnostics enabled for the first application.

At (314), the method 300 can include providing a user interface for the first application to display a diagnostic status interface, the diagnostic status interface including a separate interface element for each of the one or more first diagnostics, each interface element indicating corresponding ones of the first diagnostic signals. For instance, as described above, the embeddable diagnostics UI 110 includes an overview customized to include a separate interface element for each of the diagnostics enabled for the application, where the diagnostic signals corresponding to each respective diagnostic is shown in the corresponding diagnostic interface element.

Further to the descriptions above, a user can be provided with controls allowing the user to make an election as to both if and when systems, programs, or features described herein can enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the scope of possible combinations of features disclosed herein. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Clauses and other sequences of items joined by a particular conjunction such as "or," for example, can refer to "and/or," "at least one of", "any combination of" example elements listed therein, etc. Terms such as "based on" should be understood as "based at least in part on."

The term "can" should be understood as referring to a possibility of a feature in various implementations and not as prescribing an ability that is necessarily present in every implementation. For example, the phrase "X can perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

The term "may" should be understood as referring to a possibility of a feature in various implementations and not as prescribing an ability that is necessarily present in every implementation. For example, the phrase "X may perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

What is claimed is:

1. A computer-implemented method for generating conversion measurement diagnostics for different content applications, comprising:

requesting feature data associated with a particular account at a configured interval from a plurality of features, the feature data being indicative of interactions associated with content items;

receiving the feature data at the configured interval;

timestamping entries of the feature data received without timestamps;

processing the feature data to generate diagnostic signals according to predetermined logic for each of a plurality of available diagnostics for a plurality of applications, the diagnostic signals being in a common data format;

storing the diagnostic signals with corresponding timestamps within a common data layer;

receiving a diagnostic status request associated with the particular account from a user via a first application of the plurality of applications;

retrieving first diagnostic signals from the diagnostic signals stored within the common data layer in response to receiving the diagnostic status request, each of the first diagnostic signals being associated with one or more first diagnostics of the plurality of available diagnostics, the one or more first diagnostics being enabled for the first application;

generating a historical trend for one or more of the first diagnostic signals based at least in part on the first diagnostic signals and the corresponding timestamps via one or more intelligence engines of a machine-learned model trained on statistical data;

predicting with the machine-learned model one or more future relevant diagnostic signals for one or more of the plurality of applications based at least in part on the historical trend, the one or more future relevant diagnostic signals being different from the diagnostic signals generated according to the predetermined logic;

modifying, by a unified application programming interface, the first diagnostic signals according to a status label format for the first application; and providing a user interface for the first application to display a diagnostic status interface, the diagnostic status interface including a separate interface element for each of the one or more first diagnostics, each interface element indicating corresponding ones of the first diagnostic signals in the status label format, wherein the diagnostic status interface further includes one or both of the historical trend or the one or more future relevant diagnostic signals.

2. The computer-implemented method of claim 1, further comprising generating a recommendation for changing a setting associated with the first application based at least in part on the first diagnostic signals via the one or more intelligence engines of the machine-learned model, wherein the diagnostic status interface further includes the recommendation.

3. The computer-implemented method of claim 2, further comprising generating a link for the recommendation within the diagnostic status interface, interaction by the user with the link navigating to an interface for changing the setting.

4. The computer-implemented method of claim 1, further comprising determining an impact score for each of the first diagnostic signals, each impact score indicating an effect that the respective first diagnostic signal has on the one or more first diagnostics.

5. The computer-implemented method of claim 1, wherein retrieving the first diagnostic signals comprises referencing client configuration settings to determine the first diagnostics enabled for the first application.

6. The computer-implemented method of claim 1, wherein the feature data includes at least one of offline conversion data, consent data, or tag data.

7. A computing system for generating conversion measurement diagnostics for different content applications, comprising:

one or more processors; and one or more non-transitory computer-readable media that collectively store instructions that, when executed by the one or more processors, cause the computing system to perform operations, the operations comprising:

requesting feature data associated with a particular account at a configured interval from a plurality of features, the feature data being indicative of interactions associated with content items;

receiving the feature data at the configured interval;

timestamping entries of the feature data received without timestamps;

processing the feature data received to generate diagnostic signals according to predetermined logic for each of a plurality of available diagnostics for a plurality of applications, the diagnostic signals being in a common data format;

storing the diagnostic signals with corresponding timestamps within a common data layer;

receiving a diagnostic status request associated with the particular account from a user via a first application of the plurality of applications;

retrieving first diagnostic signals from the diagnostic signals stored within the common data layer in response to receiving the diagnostic status request, each of the first diagnostic signals being associated with one or more first diagnostics of the plurality of available diagnostics, the one or more first diagnostics being enabled for the first application;

generating a historical trend for one or more of the first diagnostic signals based at least in part on the first diagnostic signals and the corresponding timestamps via one or more intelligence engines of a machine-learned model trained on statistical data;

predicting with the machine-learned model one or more future relevant diagnostic signals for one or more of the plurality of applications based at least in part on the historical trend, the one or more future relevant diagnostic signals being different from the diagnostic signals generated according to the predetermined logic;

modifying, by a unified application programming interface, the first diagnostic signals according to a status label format for the first application; and providing a user interface for the first application to display a diagnostic status interface, the diagnostic status interface including a separate interface element for each of the one or more first diagnostics, each interface element indicating corresponding ones of the first diagnostic signals in the status label format, wherein the diagnostic status interface further includes one or both of the historical trend or the one or more future relevant diagnostic signals.

8. The computing system of claim 7, the operations further comprising generating a recommendation for changing a setting associated with the first application based at least in part on the first diagnostic signals via the one or more intelligence engines, wherein the diagnostic status interface further includes the recommendation.

9. The computing system of claim 8, further comprising generating a link for the recommendation within the diagnostic status interface, interaction by the user with the link navigating to an interface for changing the setting.

10. The computing system of claim 7, the operations further comprising determining an impact score for each of the first diagnostic signals, each impact score indicating an effect that the respective first diagnostic signal has on the one or more first diagnostics.

11. The computing system of claim 7, wherein retrieving the first diagnostic signals comprises referencing client configuration settings to determine the first diagnostics enabled for the first application.

12. The computing system of claim 7, wherein the feature data includes at least one of offline conversion data, consent data, or tag data.

13. One or more non-transitory computer-readable media that collectively store instructions that, when executed by one or more processors, cause a computing system to perform operations, the operations comprising:

requesting feature data associated with a particular account at a configured interval from a plurality of features, the feature data being indicative of interactions associated with content items;

receiving the feature data at the configured interval;

timestamping entries of the feature data received without timestamps;

processing the feature data received to generate diagnostic signals according to predetermined logic for each of a plurality of available diagnostics for a plurality of applications, the diagnostic signals being in a common data format;

storing the diagnostic signals with corresponding timestamps within a common data layer;

receiving a diagnostic status request associated with the particular account from a user via a first application of the plurality of applications;

retrieving first diagnostic signals from the diagnostic signals stored within the common data layer in response to receiving the diagnostic status request, each of the first diagnostic signals being associated with one or more first diagnostics of the plurality of available diagnostics, the one or more first diagnostics being enabled for the first application;

generating a historical trend for one or more of the first diagnostic signals based at least in part on the first diagnostic signals and the corresponding timestamps via one or more intelligence engines of a machine-learned model trained on statistical data;

predicting with the machine-learned model one or more future relevant diagnostic signals for one or more of the plurality of applications based at least in part on the historical trend, the one or more future relevant diagnostic signals being different from the diagnostic signals generated according to the predetermined logic;

modifying, by a unified application programming interface, the first diagnostic signals according to a status label format for the first application; and providing a user interface for the first application to display a diagnostic status interface, the diagnostic status interface including a separate interface element for each of the one or more first diagnostics, each interface element indicating corresponding ones of the first diagnostic signals in the status label format, wherein the diagnostic status interface further includes one or both of the historical trend or the one or more future relevant diagnostic signals.

14. The one or more non-transitory computer-readable media of claim 13, the operations further comprising generating a recommendation for changing a setting associated with the first application based at least in part on the first diagnostic signals via the one or more intelligence engines, wherein the diagnostic status interface further includes the recommendation.

15. The one or more non-transitory computer-readable media of claim 14, the operations further comprising generating a link for the recommendation within the diagnostic status interface, interaction by the user with the link navigating to an interface for changing the setting.

16. The one or more non-transitory computer-readable media of claim 13, the operations further comprising determining an impact score for each of the first diagnostic signals, each impact score indicating an effect that the respective first diagnostic signal has on the one or more first diagnostics.

17. The one or more non-transitory computer-readable media of claim 13, wherein retrieving the first diagnostic signals comprises referencing client configuration settings to determine the first diagnostics enabled for the first application.

18. The computer-implemented method of claim 1, wherein the statistical data comprises one or more of analytics data, performance metrics, the plurality of available diagnostics, the feature data, or user interactions.

19. The computer-implemented method of claim 1, further comprising:

receiving, via the diagnostic status interface, a viewing request from the user, the viewing request being associated with hiding or showing certain ones of the one or more first diagnostics;

receiving, subsequent to receiving the viewing request, a second diagnostic status request associated with the particular account from the user via a second application of the plurality of applications;

retrieving second diagnostic signals from the diagnostic signals stored within the common data layer in response to receiving the diagnostic status request, each of the second diagnostic signals being associated with one or more second diagnostics of the plurality of available diagnostics, the one or more second diagnostics being enabled for the second application;

determining, via the one or more intelligence engines, one or more certain second diagnostics overlapping in scope with the certain ones of the one or more first diagnostics;

providing the user interface for the second application to display a second diagnostic status interface, the second diagnostic status interface including a separate second interface element for each of the one or more second diagnostics, each second interface element indicating corresponding ones of the second diagnostic signals; and automatically adjusting the second diagnostic status interface to hide the second interface element for each of the one or more certain second diagnostics overlapping with the certain ones of the one or more first diagnostics associated with hiding in the viewing request.

* * * * *